United States Patent [19]
Thornbrugh

[11] 3,736,711
[45] June 5, 1973

[54] TRAILER ANCHORS

[76] Inventor: Lloyd E. Thornbrugh, P.O. Box 1124, Natchez, Miss. 39120

[22] Filed: Dec. 29, 1971

[21] Appl. No.: 213,681

[52] U.S. Cl. .................................... 52/149, 52/157
[51] Int. Cl. .............................................. E02d 5/74
[58] Field of Search ............ 52/4, 157, 166, 146–152, 52/153, 154, 23

[56] References Cited
UNITED STATES PATENTS

| 2,670,504 | 3/1954 | Peterson | 52/148 |
| 3,295,274 | 1/1967 | Fulton | 52/157 |
| 3,403,487 | 10/1968 | Doctor | 52/166 |

FOREIGN PATENTS OR APPLICATIONS

| 360,195 | 3/1962 | Switzerland | 52/166 |

*Primary Examiner*—John E. Murtagh
*Attorney*—Fred L. Witherspoon and Anthony T. Lane

[57] ABSTRACT

Various different types of anchors and an anchor system using these anchors for house trailers and the like are disclosed. One of the anchors disclosed is designed for use in a concrete slab and the others are designed to meet specific soil cOnditions. Thus, of the various different anchors disclosed, the one chosen for a given anchor system depends upon either the soil conditions where the trailer is located or the existence of a concrete trailer pad. In addition, the anchors are designed so that they can be driven in place by means of power tools. The anchor system comprises a plurality of anchors and a chain and turnbuckle arrangement associated with each anchor. Brackets are attached to the trailer frame at various different points along the frame. The anchors are driven into the ground or concrete as the case may be along the trailer and a separate chain and turnbuckle arrangement is connected between each anchor and frame bracket. The turnbuckles are then adjusted to remove any slack in the chain.

10 Claims, 7 Drawing Figures

PATENTED JUN 5 1973 3,736,711

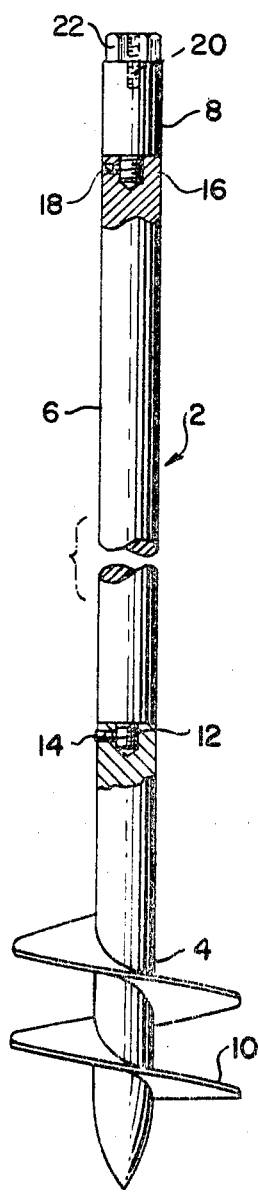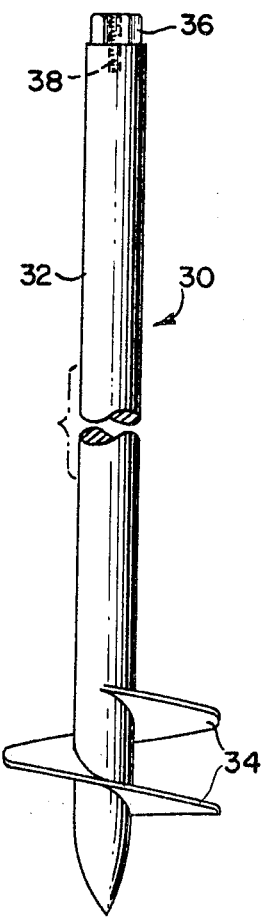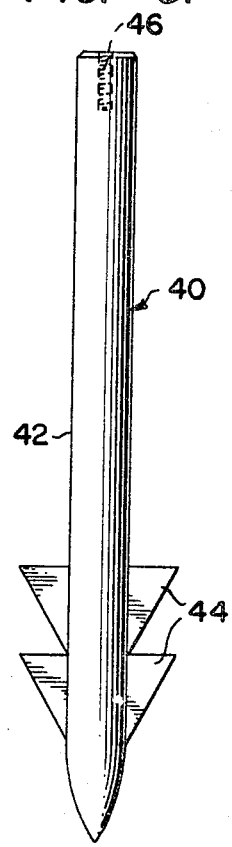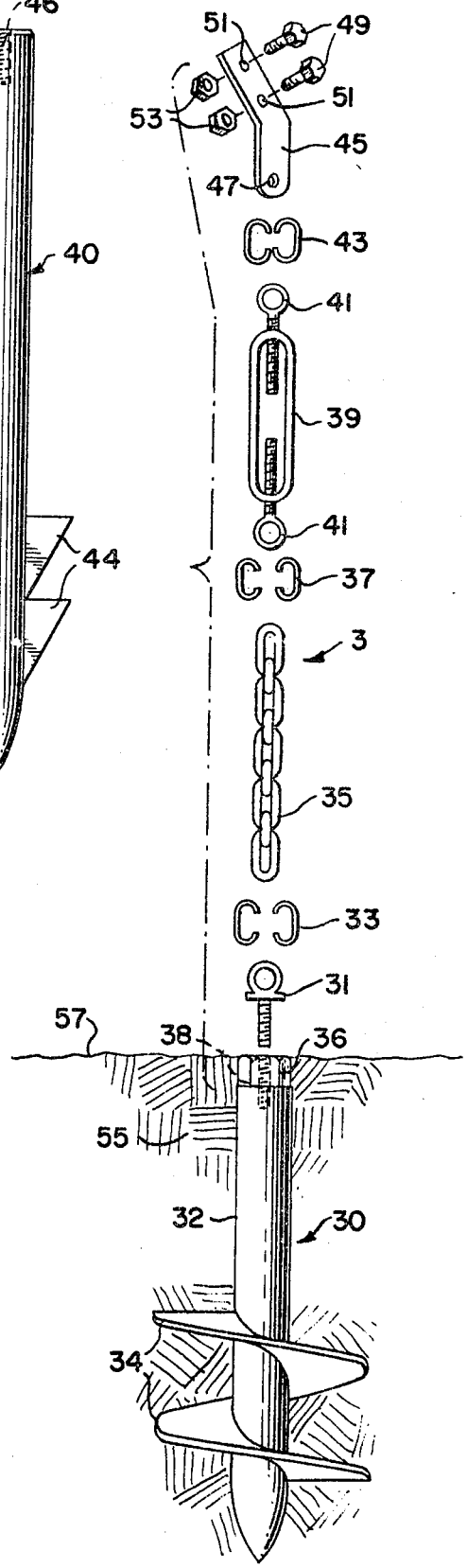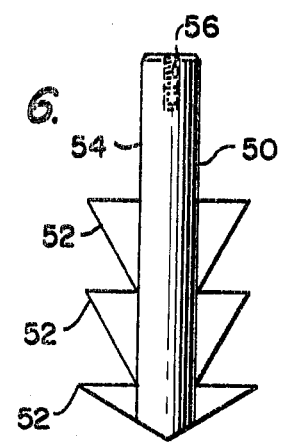

3,736,711

TRAILER ANCHORS

BACKGROUND OF THE INVENTION

The invention relates to anchors; and more specifically to anchors and an anchor arrangement for house trailers or the like.

House trailers, camping trailers and the like have been increasing in popularity in recent years, particularly camping trailers. These mobile homes are for obvious reasons rarely secured to a foundation. Even the large house trailers are rarely secured to a permanent type foundation. Because of this fact these trailers or mobile homes are extremely vulnerable to strong winds. In the United States alone there have been numerous instances where trailers, even the large house trailers have been destroyed by high winds. The wind topples the trailer or moves it along the ground until it collides with another object or is torn apart from the movement.

Various different anchoring arrangements have been devised for trailers and the like. Some of these anchoring systems have been patented. For example: U. S. Pat. No. 3,558,092, to Hanson discloses stabilizer plates for trailers with pins passing through the plates into the earth; U.S. Pat. No. 3,403,487, to Docter discloses a trailer anchor system in which U-shaped clamps fit over the sides of a concrete apron or block with a pin in the ground; a cable is run from each anchor to the trailer; U.S. Pat. No. 3,335,531 to Grimelli et al discloses anchors embedded in concrete beneath the surface of the ground; rods are connected to these anchors at both the top and bottom of the trailer; U.S. Pat. No. 3,238,678 to Barnett discloses a trailer anchor adapted to be connected to the tow bar of the trailer; and U. S. Pat. No. 3,054,151 to Shankland discloses anchors embedded in concrete with an elaborate strap arrangement passing over the top of the trailer.

The anchoring systems disclosed in the Hanson U.S. Pat. No. 3,558,092, and in the Barnett U.S. Pat. No. 3,238,678, are not really anchoring systems to protect the trailers from wind, but are stabilizing systems. The system disclosed in the Doctor U.S. Pat. No. 3,403,487, does anchor the trailer. However, this system is restricted to use with a concrete apron or concrete blocks and requires that holes be dug under the blocks or apron to install the anchors. The anchoring systems disclosed in the Grimelli et al patent and the Shankland U.S. Pat. No. 3,054,151 also disclose anchors embedded in concrete. In the Grimelli et al patent, rods are connected to the anchors at both the top and bottom of the trailer. In the Shankland patent, straps are passed over the trailer and secured to the anchors. The strap arrangement of Shankland is quite elaborate. While the Grimelli et al and Shankland system provide protection against the wind, these systems require concrete to hold the anchors; do not provide for removal of the anchors themselves, and in extremely strong winds could conceivably damage a trailer since the straps and rods are secured to the body of the trailer. A trailer body is generally not strong enough to withstand a great deal of pressure. The pressure placed on the body by the rods and straps could possibly buckle or dent the trailer body.

This invention overcomes most of the problems encountered by these prior art systems. The anchors of this invention are coupled to the trailer frame rather than the trailer body. Different types of anchors are provided to meet differing soil conditions. In addition, one of the anchors is designed for use in concrete. In most cases the anchors and anchor arrangement of this invention can be dismantled and the anchors removed so that the anchors and anchor system can be moved with the trailer. Also, the anchors are designed so that they can be power driven to any desired depth.

SUMMARY OF THE INVENTION

Several different types of anchors and an anchor system for trailers such as house trailers or the like are disclosed. The different anchors are each specifically designed to meet specific soil conditions. In addition, one of the anchors is designed to be used in concrete. Furthermore, the anchors are so constructed that they can be embedded by power tools and in most instances can be removed.

After the proper anchor has been selected for the particular site, it is power driven or hand driven into the earth or concrete as the case may be. Several anchors are placed along each side of the trailer or all around the trailer. When the anchors are in place, a chain and turnbuckle arrangement is secured to each anchor. The other end of the chain and turnbuckle arrangements are then secured to various points along the frame of the trailer. The number of anchors used is optional and would depend upon the size of the trailer and the weather conditions in the area (i.e., are strong winds prevalent or is the area subject to wind storms such as hurricanes or tornadoes) among other factors. When the chain and turnbuckle combinations have been secured to both the trailers and the anchors, the turnbuckles are adjusted to draw the chains taut so that there is no slack in the chain.

It is, therefore, an object of this invention to provide anchors for trailers such as house trailers and the like.

It is another object of this invention to provide anchor systems for house trailers such as house trailers or the like.

It is still another object of this invention to provide anchors that can be power driven into place.

It is yet another object of this invention to provide a plurality of differently designed anchors, each design being specifically adapted to meet specific conditions.

It is a further object of this invention to provide an anchor system for trailers such as house trailers or the like to protect the said trailers from damage due to wind or other causes that could move the trailer from its location.

It is still a further object of this invention to provide a trailer anchoring system that can readily be installed in any location.

It is yet a further object of this invention to provide a trailer anchoring system that can in most cases be readily dismantled and moved with the trailer for installation at the new site of the trailer.

BRIEF DESCRIPTION OF THE DRAWING

The above-mentioned and other objects of the invention will become readily apparent from the following detailed description of the invention when read in conjunction with the annexed drawing in which:

FIG. 3 shows an anchor constructed in accordance with this invention for use in a low, wet marshy location or in deep sand;

FIG. 4 shows an anchor constructed in accordance with this invention for use in a solid well-drained location;

FIG. 5 shows an anchor constructed in accordance with this invention for use in a solid rock or rocky location;

FIG. 6 shows an anchor constructed in accordance with this invention for use in concrete; and FIG. 7 shows an entire anchor system constructed in accordance with this invention.

DESCRIPTION OF THE INVENTION

Figure 1:
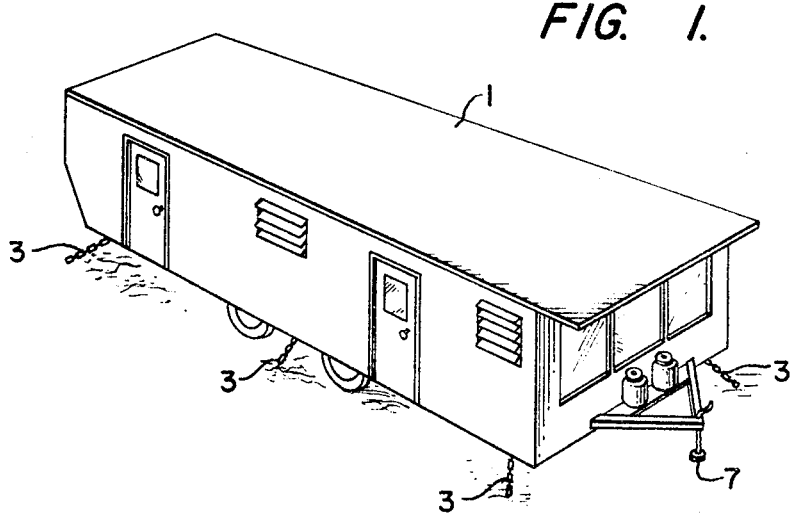
FIG. 1 is a pictorial view of a typical house trailer equipped with an anchor system of this invention.

Referring first to FIGS. 3, 4, 5 and 6, these figures show various different anchors each constructed in accordance with this invention for use in a particular environment. Referring specifically to FIG. 3, the anchor 2 is shown as comprising the three sections 4, 6 and 8. Anchor 2 is designed to be used in low, wet marshy locations or in deep sand.

Section 4 of anchor 2 is essentially a mooring screw having helically shaped blades 10 near its lower end. As will be apparent later, blades 10 are used to in effect screw anchor 10 into the ground. A threaded hole not readily apparent and not labeled is cut into the top of section 4.

Section 6 of anchor 2 is cylindrical shaped and has a bolt 12 at its lower end and a threaded hole not labeled cut into its upper end. Bolt 12 of section 6 is threaded into the hole of lower section 4 and locked in place by means of a set screw 14.

Upper section 8 which is shown as a relatively short section has a bolt 16 at its lower end and a threaded hole 20 cut into its upper end. In addition the upper end of section 8 is threaded to accommodate the nut 22. Bolt 16 of section 8 is threaded into the hole of section 6 and is locked in place by means of a set screw 18.

Since anchor 2 is designed to be used in a low, wet marshy location or a location having deep sand, it must be relatively long. For this rerson, anchor 2 is designed such that it can readily be extended to any desired length. If a particular location requires a very long anchor, upper section 8 is removed and an additional section identical to section 6 is added to the section 6 with section 8 added to the top of this new section. In this manner anchor 2 can be extended to any desired length.

In actual practice, anchor 2, as shown in FIG. 3, is driven into the ground by means of a power tool. A conventional power tool is fitted over nut 22 and anchor 2 is threaded into the ground by threads 10. Nut 22 is specifically provided for use with a conventional power tool If it is found that the length of anchor 2 must be increased, upper section 8 is removed after the anchor has been driven into the ground most of the way and a secton identical to section 6 is added to section 6, section 8 is secured to this new section and the anchor is driven further into the ground. While it has been stated that the new sections will be identical to section 6, it should be obvious that section 6 and these other sections like section 6 could be fabricated in different lengths. For low, wet marshy or deep sand locations, anchor 2 sould be at least a 6 inch anchor and approximately 60 inches long if no additional sections are added. This size anchor is easy to work with and would be sufficiently long in most cases. However, as has been mentioned, the length can be easily extended. The purpose of threaded hole 20 will become apparent later.

FIG. 4 shows an anchor 30 designed to be used in solid well-drained soil. Anchor 30 is at least a 4 inch anchor and should be approximately 40 inches long. Again, the size is not critical, but use of an anchor smaller than 4 inches or much shorter than 40 inches would not be advisable for the purpose intended for anchor 30. This anchor comprises thread plates 34 integrally fabricated on a shaft 32. The top of shaft 32 is threaded to receive a nut 36 and contains a threaded hole 38. The purpose of hole 38 will be apparent later. As was the case with anchor 2, nut 36 of anchor 30 is used to accommodate a power tool for threading anchor 30 into the ground.

For soil conditions between the wet marshy soils for which anchor 2 is designed and the well drained soil for which anchor 30 is designed, a five inch anchor identical to either anchor 30 or anchor 2, but slightly longer than anchor 30, may be used. From a practical standpoint, an anchor such as anchor 2 would probably be used to cut down on the number of different size anchors that would have to be on hand. Of course, anchor 2 of FIG. 3 could be used in well drained soils also, but anchor 30 of FIG. 4 would not be suitable for marshy or deep sand conditions.

FIG. 5 shows an anchor 40 that is designed to be used in solid rock or part rock locations. Anchor 40 comprises a cylindrical shaft 42 having a pair of hold down blades 44 integrally fabricated thereon. Hold down blades 44 would typically be 2 inch blades. The top of shaft 42 has a threaded hole 46, the purpose of which will be apparent later. Anchor 40 is typically 18 inches or longer.

Anchor 40 is designed to be power driven into the ground by means of a power ram or the like. In order to protect the top of shaft 42 during driving, a protective block could be threaded into hole 46 and later removed or the entire shaft could be made of or topped with a sufficiently hard material.

The anchor 50 of FIG. 6 is similar to anchor 40 of FIG. 5, but is shorter and designed for use in concrete. Anchor 50 comprises a shaft 54 having three hold down blades 52 integrally fabricated therewith. The two upper hold down blades 52 would typically be approximately 2 inch blades with the lower blade 52 being slightly longer as shown. The overall length of anchor 50 is approximately 6 inches or more. Again, anchor 50 is provided with a threaded hole 56. Anchor 50 can be power driven into a concrete trailer pad or placed in the pad when the pad is poured. When added after the trailer pad is poured, the pad would be patched with concrete or the like to hold the anchor in place.

FIG. 7 shows an entire anchor system 3 constructed in accordance with this in invention; however, the parts are separated for ease of description. The system is shown as using anchor 30 and therefore in well drained solid soil. Anchor 30 is shown as being threaded into the ground 55 with its hex nut 35 approximately at ground level 57.

An eye bolt 31 is made to be threaded into hole 36. Hole 36 and all the similar threaded holes of anchors 2, 40 and 50 are provided for receiving eye bolt 31. The close type C link 33 is then closed through the eye of bolt 31 and to one of the end links of a length of chain 35. A turnbuckle 39 having an eye bolt 41 at each end is provided. A second close type C link is closed on the other end link of chain 35 and through one of the eye bolts 41 os turnbuckle 39. A third close C type clamp is closed through the other eye bolt 41 of turnbuckle 39 and through a hole 47 in the bracket 45. Bracket 45 is provided with two more holes 49 for receiving the bolts 49 which mate with the nuts 53. Bracket 45, nuts 53 and bolts 49 are used to secure the anchor system to the trailer. While this turnbuckle, chain, eye bolt, C clamp and bracket arrangement could be preassembled, it is more desirable to assemble this system at the site where it is being used because eye bolt is easier to thread into the top of the anchor before assembly and to permit the use of different lengths for chain 35.

Figure 2:
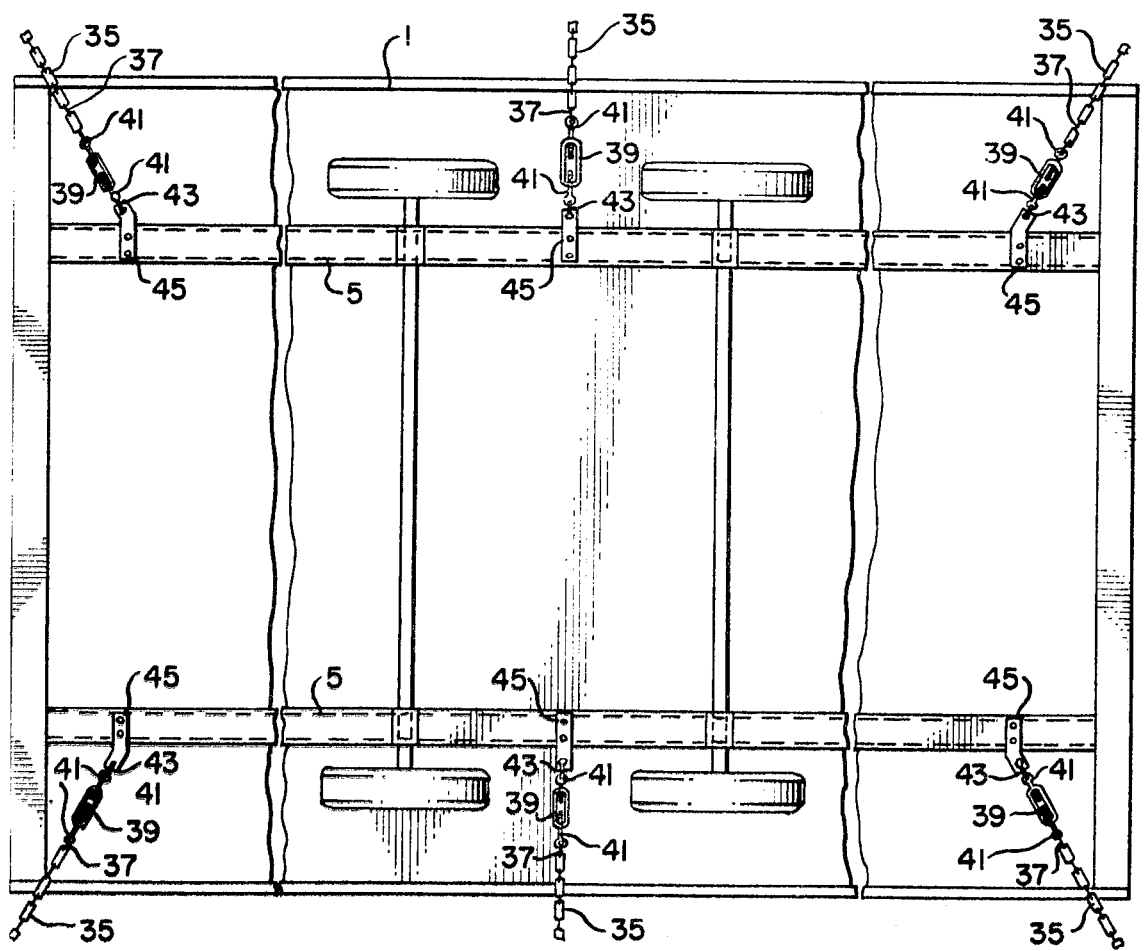
FIG. 2 is a view of the underside of a typical trailer showing how the anchor system of FIG. 1 is secured to the frame of the trailer.

Brackets 45 are designed to be attached to the frame of a trailer as shown in FIG. 2. FIG. 2 shows the underside of a typical four-wheeled house trailer 1. Six brackets 45 are shown attached to the trailer frame 5, three on each side. Holes are drilled through the frame and brackets 45 are secured to frame 5 by means of bolts 49 and nuts 51. Bracket 45 could, of course, be attached to frame 5 at the time of manufacture by welding or could be integrally fabricated as part of the frame. Any number of these brackets could be provided with all or just some of them actually being used. The minimum number of anchor assemblies 3 actually needed with a given trailer will depend upon the size of the trailer, the soil conditions, and the weather conditions among other things. Thus, the fact that six assemblies are shown in FIG. 2 is not to be considered as minimum or maximum number that might be used. Also, the point on frame 5 at which brackets 45 are received can be different than that shown.

FIG. 1 is a pictorial view of house trailer 1 with the anchor assemblies 3 arranged as in FIG. 2. It is to be remembered, however, that the arrangement shown is illustrative only and that any other number and/or different arrangement of assemblies 3 can be used. Trailer 1 in FIG. 1 is shown as being parked on the ground rather than on a concrete pad. Therefore, depending upon the soil conditions either anchor 2, 30 or 40 would be used to make up assemblies 3.

After the anchors are driven into place and an equal number of the chain, turnbuckle, etc. assemblies are put together and attached to the anchors and the frame of the trailer, turnbuckle 39 is adjusted to draw up the chain and turnbuckle assembly until there is no slack in this assembly. This step is very important because the trailer could be rocked or bounced in a high wind if there is any slack in the linkage between the frame and the anchor. Such rocking or bouncing would not only be frightening or perhaps injurious to the occupants but could damage the trailer or at least its contents. Furthermore, rocking of any anchored object can set up violent forces that can break the object loose from its anchoring. Another important feature of this invention is the manner in which the anchor assemblies are attached to the trailer. The assemblies are attached to the frame which is generally the strongest part of the trailer. Therefore, the anchor assemblies can be drawn up very taut without fear of damage to the trailer and there is little chance that the anchor will be broken loose.

Another important feature not generally found in prior art trailer assemblies is the removable feature of this invention. If one desires to move his trailer to another location, the turnbuckle, chain, etc. assembly can be detached from the frame and the anchor. Similarly, one will in most cases, except in the case of anchor 50 which would be embedded in concrete, be able to remove the anchors also. Thus, the entire anchor assembly can be moved to the new site for installation at the new site.

While the invention has been described with reference to specific embodiments, it will be obvious to those skilled in the art that various changes and modifications can be made to the embodiments shown without departing from the spirit and scope of the invention as set forth in the appended claims.

I claim:

1. An assembly for anchoring an object in place comprising:
   an anchor embedded into the surface adjacent the surface upon which said object is located,
   said anchor comprising a first section having blades fabricated near one end thereof and a threaded hole at its other end,
   a second section having a bolt at one end adapted to mate with said threaded hole of said first section and a threaded hole at its other end,
   a first set screw provided to lock said bolt of said second section in place when said bolt of said second section is mated with said first section,
   a third section having external threads at one end, a threaded hole at said externally threaded end and a bolt at its other end, said bolt of said third section being adapted to mate with said threaded hole of said second section,
   a second set screw for locking said bolt of said third section in place when said bolt of said third section is mated with said threaded hole of said second section, and
   a nut threaded onto said external threads of said third section;
   an eye bolt threaded in said threaded hole of said third section;
   a bracket designed to be attached to said object that is to be anchored;
   a flexible linkage having first and second ends;
   means to connect said first end of said flexible linkage to said eye bolt;
   a mechanism adjustable in length;
   means to connect one end of said adjustable mechanism to said second end of said flexible linkage; and
   means to connect the other end of said adjustable mechanism to said bracket.

2. An anchor as defined in claim 1 wherein a plurality of said second sections each having a bolt at one end and a threaded hole at the other end are joined end to end to lengthen said anchor.

3. An anchor assembly as set forth in claim 1 wherein said object to be anchored in place is a trailer and said bracket is attached to the frame of said trailer.

4. An anchor assembly as defined in claim 1 wherein at least six of said assemblies are provided and wherein said brackets are so attached to said trailer frame that at least one bracket is located at approximately each of the four corners of said frame, at least one at approximately the center of said frame on one side of said trailer, and at least one at approximately the center of said frame on the other side of said trailer.

5. An anchor assembly as defined in claim 1 wherein said blades are helical.

6. An anchor assembly as defined in claim 1 wherein said blades are generally triangular shaped.

7. An anchor assembly as defined in claim 1 wherein said blades are generally rectangular shaped.

8. A trailer anchor assembly for anchoring a trailer in place comprising:
   at least six anchor assemblies each comprising:
   an anchor having blades at one end thereof, external threads at its other end and a threaded hole at the externally threaded end;
   an eye bolt designed to be threaded into said hole;
   a bracket designed to be attached to the frame of said trailer;
   a flexible linkage having first and second ends;
   means to connect said first end of said flexible linkage to said eye bolt;
   a mechanism adjustable in length;
   means to connect one end of said adjustable mechanism to said second end of said flexible linkage;
   means to connect the other end of said adjustable mechanism to said bracket; and
   a nut designed to be threaded on said external threads.

9. The trailer anchor assembly as defined in claim 8 wherein the said brackets of each of said at least six assemblies are so attached to said frame that a bracket is located at approximately each of the four corners of said frame and one on each side of the frame at approximately the longitudinal center of said frame.

10. The trailer anchor assembly as defined in claim 9 wherein each of said anchors comprises a plurality of sections with the first section having said blades at one end thereof and a threaded hole at the other end, the balance of said sections each having a bolt at one end thereof and a threaded hole at the other end thereof with one of said balance of said sections having said external threads on the end having said threaded hole, said sections being joined end to end to form said anchor with the bolt of one section threaded into the hole of another section in such a manner that said blades are adjacent one end of the anchor and the external threads at the other end of the anchor.

* * * * *